United States Patent
Stickland

(10) Patent No.: US 9,807,513 B2
(45) Date of Patent: Oct. 31, 2017

(54) ELECTROACOUSTIC TRANSDUCER

(71) Applicant: Gill Instruments Limited, Hampshire (GB)

(72) Inventor: Anthony Charles Robert Stickland, Hampshire (GB)

(73) Assignee: Gill Instruments Limited, Hampshire (GB)

( * ) Notice: Subject to any disclaimer, the term of this patent is extended or adjusted under 35 U.S.C. 154(b) by 106 days.

(21) Appl. No.: 14/717,143

(22) Filed: May 20, 2015

(65) Prior Publication Data

US 2015/0350789 A1     Dec. 3, 2015

(30) Foreign Application Priority Data

May 29, 2014 (GB) .................................. 1409547.5

(51) Int. Cl.
| | |
|---|---|
| *H04R 17/00* | (2006.01) |
| *H04R 1/10* | (2006.01) |
| *H04R 7/16* | (2006.01) |
| *B06B 1/06* | (2006.01) |
| *G10K 9/20* | (2006.01) |
| *G01P 5/24* | (2006.01) |
| *G10K 9/122* | (2006.01) |

(52) U.S. Cl.
CPC .......... *H04R 17/00* (2013.01); *B06B 1/0666* (2013.01); *G10K 9/20* (2013.01); *H04R 1/1016* (2013.01); *H04R 7/16* (2013.01); *G01P 5/245* (2013.01); *G10K 9/122* (2013.01)

(58) Field of Classification Search
CPC ...... H04R 17/00; H04R 17/005; H04R 17/02; H04R 17/025; H04R 17/10; H04R 2460/13; H04R 25/605; H04R 2217/01
See application file for complete search history.

(56) References Cited

U.S. PATENT DOCUMENTS

| | | | |
|---|---|---|---|
| 3,943,388 A | 3/1976 | Massa | |
| 4,754,440 A * | 6/1988 | Naruse .................. | B06B 1/0666 |
| | | | 181/148 |
| 6,629,922 B1 * | 10/2003 | Puria ................... | H04R 25/606 |
| | | | 381/312 |
| 2002/0096973 A1 * | 7/2002 | Zhang .................... | G10K 9/121 |
| | | | 310/334 |
| 2007/0041595 A1 * | 2/2007 | Carazo .................. | H04R 17/00 |
| | | | 381/151 |
| 2007/0057601 A1 * | 3/2007 | Kawase ................ | H04R 17/00 |
| | | | 310/328 |
| 2007/0228893 A1 | 10/2007 | Yamauchi et al. | |
| 2008/0294356 A1 | 11/2008 | Poulos et al. | |

(Continued)

FOREIGN PATENT DOCUMENTS

| | | |
|---|---|---|
| DE | 10 2012 201884 | 8/2013 |
| WO | 2009/086805 | 7/2009 |

*Primary Examiner* — Matthew Eason

(74) *Attorney, Agent, or Firm* — Clark & Brody

(57) ABSTRACT

An electroacoustic transducer comprising an electromechanical transducer and a vibratory component. The latter has a generally cylindrical side wall, an outwardly directed portion at the base of the side wall, and a generally planar vibratory top wall extending inwardly from the rim of the side wall further from its base to close the upper end of the cylindrical side wall. The said outwardly directed portion is mounted on the electromechanical transducer.

17 Claims, 2 Drawing Sheets

(56) References Cited

U.S. PATENT DOCUMENTS

Figure 1:
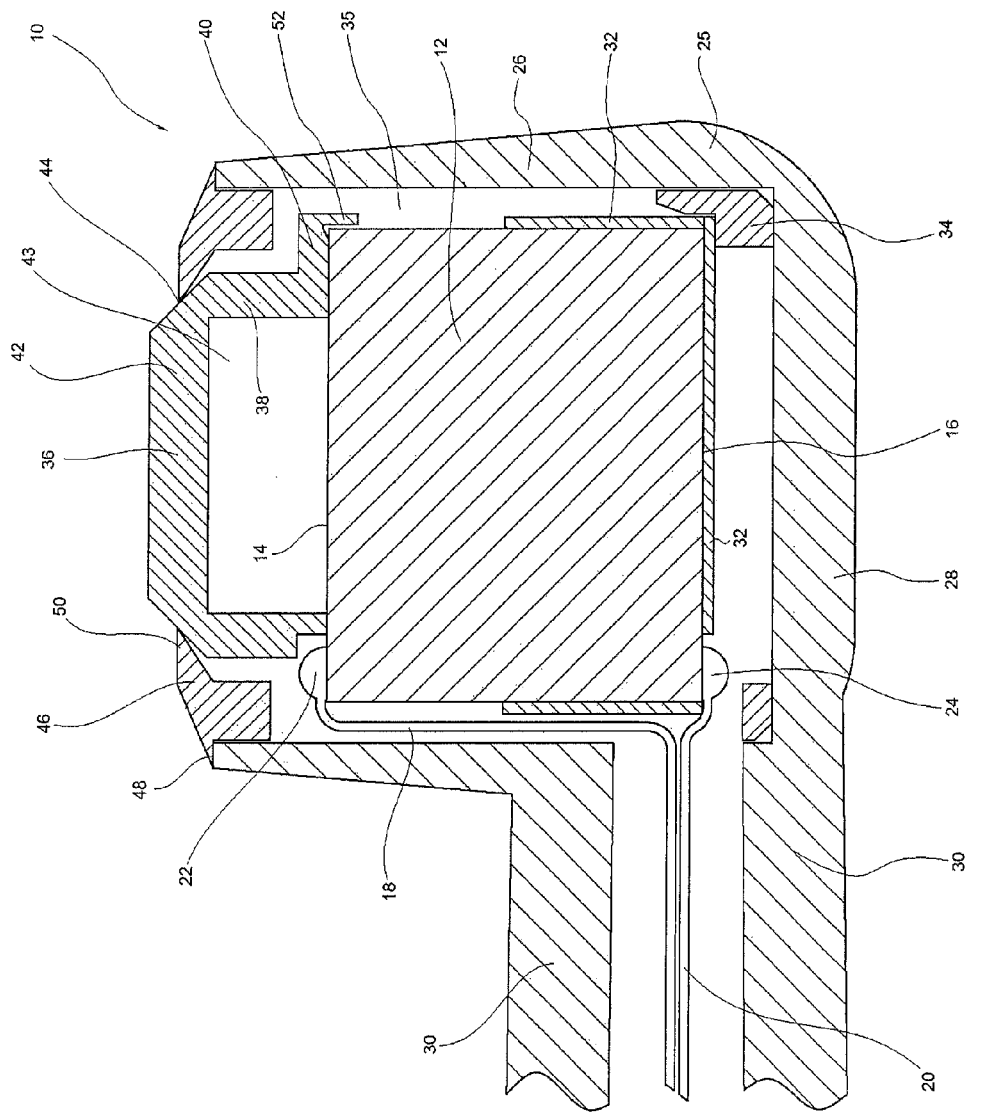

| | | | |
|---|---|---|---|
| 2009/0245553 A1* | 10/2009 | Parker | H04R 25/70 381/326 |
| 2009/0303839 A1* | 12/2009 | Narayanan | G10K 9/121 367/164 |
| 2010/0189288 A1* | 7/2010 | Menzel | A61C 5/00 381/151 |
| 2011/0255718 A1* | 10/2011 | Fukushima | H04R 17/00 381/190 |
| 2013/0169111 A1* | 7/2013 | Ibata | G10K 9/122 310/322 |
| 2015/0117682 A1* | 4/2015 | Fukami | B06B 1/0603 381/190 |
| 2015/0117683 A1* | 4/2015 | Ozasa | B06B 1/0603 381/190 |
| 2015/0187349 A1* | 7/2015 | Schafer | G10K 9/121 367/189 |

* cited by examiner

ELECTROACOUSTIC TRANSDUCER

The present invention relates to an electroacoustic transducer comprising an electromechanical transducer and a vibratory component coupled thereto.

Such an electroacoustic transducer is disclosed in U.S. Pat. No. 3,943,388. It utilises a vibratory diaphragm to form a closure for a cylindrical tubular housing. The sound radiating surface of the diaphragm is of a concave shape to achieve an increasing diaphragm thickness at its periphery. The concave diaphragm design permits the precise adjustment of the resonant frequency of large quantities of mass produced transducers by machining the surface of the thick rim portion of the diaphragm. Greater precision in the adjustment of the resonant frequency is achieved with this design because the frequency change is less critically dependent on the amount of material removed than is the case with a conventional flat diaphragm surface. However, because a piezoceramic device is attached directly to the underside of the vibratory diaphragm, the resulting transmission is compromised as regards its uniformity as a function of angle of transmission from the central perpendicular of the vibratory diaphragm. Thus in a forward direction away from the diaphragm surface, a plot of sound intensity as a function of angle away from a central perpendicular to the surface may have lobes, because the surface may vibrate with anti-nodes.

The present invention seeks to provide a remedy.

Accordingly the present invention is directed to an electroacoustic transducer comprising an electromechanical transducer and a vibratory component having a generally cylindrical side wall, an outwardly directed portion at the base of the side wall, and a generally planar vibratory top wall extending inwardly from the rim of the side wall further from its base to close the upper end of the cylindrical side wall, in which the said outwardly directed portion is mounted on the electromechanical transducer.

This provides the advantage that the transducer in operation produces a uniform radiation pattern over a wide-angle, such that the radiation pattern varies slowly and smoothly with angle away from a central perpendicular to the top wall. This is effected by virtue of the flexural mode of the vibratory component. It makes the electroacoustic transducer especially suitable for applications in which the sound emitted by the transducer passes through a medium such as air which may be moving transversely of a perpendicular to the top wall of the vibratory component. One such application is in the construction of an anemometer. In such a construction, at least two such electroacoustic transducers are arranged opposing one another, so that each is able to transmit sound signals to and receive sound signals from the other of the pair of transducers.

The side wall, top wall and outwardly directed portion of the vibratory component may be constituted by a single integral piece of material.

The cylindrical side wall may be circular in cross section.

The portion which extends outwardly from the base of the side wall may be or may be part of a flange extending around the base of the side wall. The flange may be annular, and may be a full ring, or it may be an open ring with a gap between the ends of the ring to accommodate an electrical connection to the electromechanical transducer.

The electromechanical transducer may comprise a piezoceramic device, for example a piezoceramic block or crystal.

The vibratory component may comprise metal, for example aluminium, for example aluminium 6082.

A corner of the vibratory component where the top wall meets the side wall may be chamfered.

The electroacoustic transducer may be provided with a housing surrounding the electromechanical transducer.

An inwardly directed lip of the housing may abut the said corner and, if the corner is chamfered, may abut the corner at the centre of the chamfering.

This results in a low acoustic coupling between the housing and the vibratory component, the flexural-mode of the vibratory component then being such that a nodal ring is created when the electroacoustic transducer is in use around the upper end of the vibratory component where the lip of the housing forms a seal with the vibratory component, so that energy is not lost into the housing but rather is transmitted as sound from the top wall of the vibratory component. At the same time, it provides a good seal around the vibratory component so that any parts of the vibratory component which are in anti-phase with the top wall thereof are shielded from positions outside the housing, so that any sound created by such parts of the vibratory component will not interfere with the sound emanating from the top wall. Furthermore, such an electroacoustic transducer is environmentally robust, so that it may be made substantially waterproof, dustproof, and of a rugged construction.

The inwardly directed lip of the housing may be provided by a ring located at an upper rim of the housing.

The ring may comprise a plastics material such as acetal, and the housing may comprise moulded plastics, for example 30% glass bead filled polybutylene teraphthalate (PBT).

The electromechanical transducer may be seated on the base of the housing interior on three feet. The latter may be equiangularly spaced around the base of the interior of the housing, with the angular spacing between any pair of feet being substantially 120°.

The present invention extends to an anemometer comprising at least two electroacoustic transducers each constructed in accordance with the present invention, the two transducers being spaced apart from one another and being oriented so that each is able to transmit sound towards and receive sound from the other of the pair.

The anemometer may comprise three such pairs with their respective axes of transmission and reception being oriented mutually orthogonally relative to one another, or such that those the three axes have at least components lying along three mutually orthogonal axes respectively.

Figure 2:
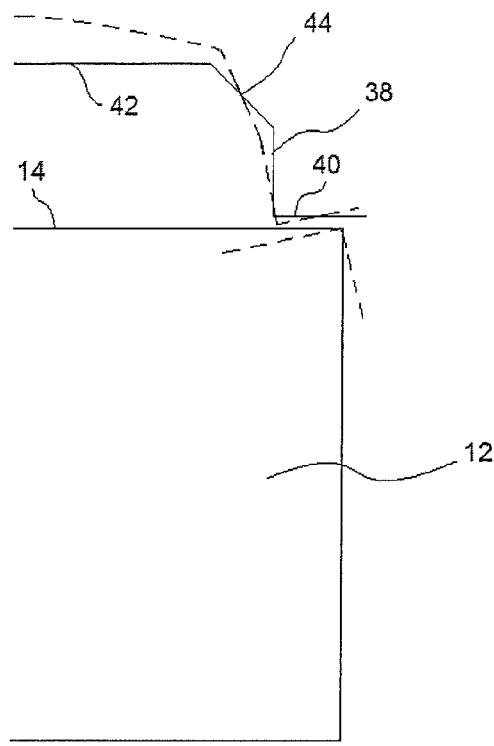
Figure 3:
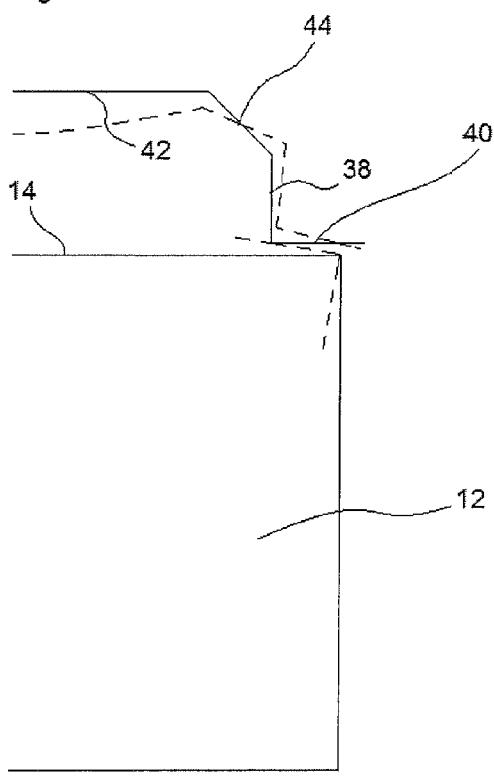

An example of an electroacoustic transducer embodying the present invention will now be described in greater detail with reference to the accompanying drawings, in which:

FIG. 1 shows an axial sectional view of an electroacoustic transducer embodying the present invention; and FIGS. 2 and 3 are respective diagrams showing the flexural mode of parts of the electroacoustic transducer at respective successive different times.

With reference to the only Figure of the present specification, an electroacoustic transducer 10 comprises a cylindrical block of circular cross-section of piezoceramic material 12 constituting an electromechanical transducer and having a circular planar upper main face 14 and a circular planar lower main face 16.

Respective electrically conductive wires 18 and are connected to electrical connections 22 and 24, both constituted by blobs of solder, in electrical contact with the upper and lower planar surfaces 14 and 16 respectively of the piezoceramic block 12.

The piezoceramic block 12 is enclosed within a moulded plastics housing 25 with a generally cylindrical side wall 26 of circular cross-section and a generally circular base portion 28, so that the housing 25 has a generally cylindrical interior of circular cross-section. Extending laterally of the cylindrical portion 26 is a tubular portion 30 surrounding and protecting the electrical connector wires 18 and 20.

The lower half of the piezoceramic block 12 is covered with tape 32 except for a portion of the lower planar surface 16 to which is attached the electrical contact 24.

The piezoceramic block 12 is seated within the interior of the housing 26 on the circular base portion thereof via the intermediary of three plastics (acetal) feet 34 only one of which is visible in the axial section of the only Figure of the drawing. The feet 34 are equiangularly spaced about the central axis of the housing 26, so that the angle subtended from that axis by any pair of feet 34 is substantially 120°. The spacing 35 between the block 12 and a housing 25 is filled with silicone rubber.

Attached so as to be acoustically coupled with the upper planar surface 14 of the piezoelectric block 12 is a vibratory component 36 in the form of a metallic "top hat", the metal of which comprises aluminium 6082, although other metals could be used. Thus the component comprises a cylindrical tubular side wall 38 of circular cross-section, an annular flange 40 extending outwardly from the base of the cylindrical side wall 38 except where the electrical connection 22 is located, so that the annular flange 40 is constituted by an open ring.

It is through the underside of the annular flange 40 that the component 36 contacts and is in acoustic coupling with the piezoelectric ceramic block 12, albeit through the intermediary of adhesive (not shown).

An annular skirt 52 of the vibratory component 36 extends downwardly from the outer rim of the annular flange 40, but there is a small gap between skirt 52 and the upper end of the cylindrical wall of the piezoceramic block 12. A gap also exists between the exterior upper corner of the block 12 and the interior corner of the component 36 where the skirt 52 meets the annular flange 40.

The component 36 further comprises a top wall extending inwardly from an upper rim of the cylindrical side wall 38 to close the upper end of the that side wall 38 and to constitute a vibratory membrane. The interior 43 of the component 36 is air-filled. The outer corner between the cylindrical side wall 38 and the top wall 42 of the component 36 is chamfered.

A sealing ring 46 extends between the upper rim 48 of the housing 25 and the chamfered corner 44 of the component 36. Thus the ring 46 provides an inwardly directed sealing lip 50 that contacts the component 36 midway between the extremities of the chamfered corner 44.

When the electroacoustic transducer 10 is in use, a high frequency oscillating voltage is applied across the connections 22 and 24 via the electrically conductive wires 18 and 20, and hence across the planar surfaces 14 and 16 of the piezoceramic block or crystal 12. The frequency is the resonant frequency of the block or crystal 12, being a frequency in the ultrasonic range of frequencies. As a consequence, the block or crystal vibrates, in turn causing the vibratory component 36 to vibrate. The flexural mode of such vibration is one in which material see-saws through very small distances about the annular line of contact of the lip 50 with the chamfered corner 44, between the respective positions indicated in FIGS. 2 and 3 (in which displacements from normal positions have been exaggerated for explanatory purposes), rocking alternately in a clockwise and an anticlockwise sense about that line of contact, so that this annular line or ring is a nodal ring, and there is substantially no movement of the material of the component 36 at this line of contact. As is evident from FIGS. 2 and 3, this is brought about by coupling the rotary motion of the crystal 12 at its corners with the resulting rotary motion of the chamfered corner 44 via the side wall 38. The upper surface of the top wall 42 vibrates towards and away from the block or crystal 12, so as to create sound waves travelling away from that wall, with a uniform radiation pattern over a wide-angle, such that the radiation pattern varies slowly and smoothly with angle away from a central perpendicular to the top wall 42. It is not adversely affected by the vibration of the side wall 38, which is in anti-phase with the vibration of the top wall 42, because the side wall 38 is shielded by the housing 25. This pattern stays consistent with temperature. It will be appreciated that this radiation pattern is obtained by shielding the side wall 38 of the vibratory component 36 from the top wall 42, by isolating the side wall 38 from the exterior.

An anemometer (not shown) may comprise three pairs of electroacoustic transducers each made as illustrated in the only Figure of the accompanying drawings, oriented so that the transducers of each pair are directed towards one another, and the respective axes of transmission and reception of the three pairs are mutually orthogonal to one another or at least have components respectively along three mutually orthogonal axes.

Numerous modifications and variations to the illustrated construction of electroacoustic transducer may occur to the reader without taking the resulting construction outside the scope of the present invention. To give one example only, the cylindrical side wall of the vibratory component may have a square or polygonal cross-section rather than a circular cross-section, although a circular cross-section is preferred.

The invention claimed is:

1. An electroacoustic transducer comprising a piezoceramic block and a vibratory component having a generally cylindrical side wall, an outwardly directed portion at the base of the side wall, and a generally planar vibratory top wall extending inwardly from the rim of the side wall further from its base to close the upper end of the cylindrical side wall, in which the said outwardly directed portion is mounted on the piezoceramic block, the electroacoustic transducer further comprising a housing surrounding the piezoceramic block, wherein an inwardly directed lip of the housing abuts a corner of the vibratory component where the top wall meets the side wall and, if the corner is chamfered, abuts the corner at the center of the chamfering.

2. An electroacoustic transducer according to claim 1, wherein the cylindrical side wall, top wall and outwardly directed portion of the vibratory component are constituted by a single integral piece of material.

3. An electroacoustic transducer according to claim 1, wherein the cylindrical side wall is circular in cross section.

4. An electroacoustic transducer according to claim 1, wherein the portion which extends outwardly from the base of the side wall is or is part of a flange extending around the base of the side wall.

5. An electroacoustic transducer according to claim 4, wherein the flange is annular.

6. An electroacoustic transducer according to claim 5, wherein the flange is a full ring.

7. An electroacoustic transducer according to claim 5, wherein the flange is an open ring with a gap between the ends of the ring to accommodate an electrical connection to the piezoceramic block.

8. An electroacoustic transducer according to claim 1, wherein the vibratory component comprises metal.

9. An electroacoustic transducer according to claim 1, wherein a corner of the vibratory component where the top wall meets the side wall is chamfered.

10. An electroacoustic transducer according to claim 1, wherein the inwardly directed lip of the housing is provided by a ring located at an upper rim of the housing.

11. An electroacoustic transducer according to claim 10, wherein the ring comprises a plastics material.

12. An electroacoustic transducer according to claim 1, wherein the housing comprises molded plastics.

13. An electroacoustic transducer according to claim 1, wherein the piezoceramic block is seated on the base of the housing interior on three feet.

14. An electroacoustic transducer according to claim 13, wherein the said three feet are equiangularly spaced around the base of the interior of the housing, with the angular spacing between any pair of feet being substantially 120°.

15. An anemometer comprising at least two electroacoustic transducers each constructed in accordance with claim 1, the two transducers being spaced apart from one another and being oriented so that each is able to transmit sound towards and receive sound from the other of the pair.

16. An electroacoustic transducer according to claim 8 wherein said metal is aluminum.

17. An electroacoustic transducer according to claim 12 wherein said molded plastics comprises 30% glass bead filled polybutylene terephthalate (PBT).

\* \* \* \* \*